Aug. 29, 1933.  E. BISSCHOP  1,924,103
SQUIRREL CAGE ROTOR
Filed Sept. 22, 1931
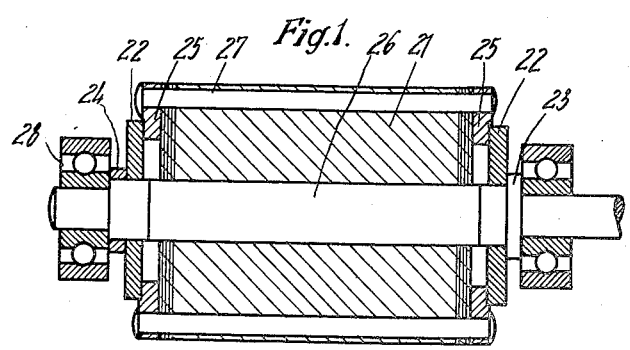
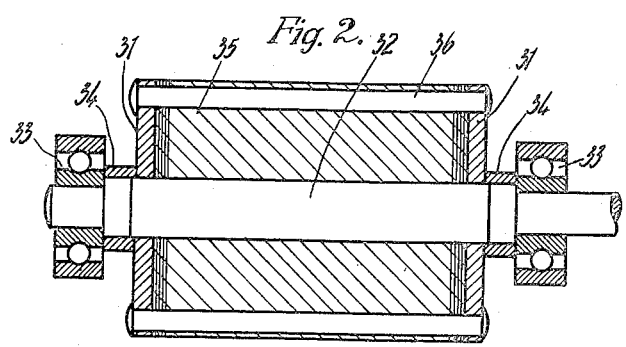
Inventor
Eelco Bisschop
by Knight Bro
attorneys Patented Aug. 29, 1933

1,924,103

UNITED STATES PATENT OFFICE 1,924,103

SQUIRREL-CAGE ROTOR

Eelco Bisschop, Berlin-Siemensstadt, Germany, assignor to Siemens-Schuckertwerke Aktiengesellschaft, Berlin-Siemensstadt, Germany, a Corporation of Germany Application September 22, 1931, Serial No. 564,321, and in Germany September 29, 1930

2 Claims. (Cl. 172—120)

My invention relates to squirrel-cage rotors and more particularly to squirrel cage rotors for electrical percussion tools.

The shocks and vibrations occurring under service conditions in percussion tools driven by electric motors are, in spite of the use of elastic intermediate members, transmitted to the rotor of the motor. Such motors when operated with three-phase current mostly have squirrel-cage, or short-circuited rotors. When such a rotor is thus forced to vibrate in axial direction, the masses of the short-circuiting rings exert a considerable pull on the rotor bars or conductors. As these bars are usually made of copper, they are stretched owing to the low yield point of that material, so that the packet of core laminations is loosened, which is usually held together at its ends near the core periphery by the conductor bars and the short-circuiting rings at the core periphery.

According to my invention this drawback is avoided by a special design of the rotor making it impossible for the rotor bars to be stretched. For this purpose strong pressure disks may be placed against the short-circuiting rings at the two ends of the laminated core and in a suitable manner be tightly pressed against the short-circuiting rings, for example by means of a thread on the rotor shaft. The short-circuiting rings are thereby tightly held against the rotor ends, and prevented from exerting any stretching forces upon the rotor conductor bars through independent vibrations of the rings.

Another possibility for obtaining this object is to shape the short-circuiting elements in the form of rigid disks extending to the shaft, and to hold them tightly there, for example by means of spacing fixed on the shaft. The disadvantageous stretching of the rotor bars through the effect of the vibrations of the short-circuiting rings can also be avoided by employing for the rotor bars a material having as small a coefficient of elongation as possible and a high yield point, instead of the usual copper bars having a low yield point and a large coefficient of elongation. These conditions are fulfilled, for example by specially hard drawn or cast bars of copper, aluminium or suitable alloys of these metals. Aluminium and its alloys, specially when used at the same time as a material for the short-circuiting rings, have also the special advantage that, owing to their low specific weight, they reduce the action of the masses considerably.

My invention is illustrated in the accompanying drawing in which Fig. 1 represents a rotor in longitudinal section showing one form of my improvement, and Fig. 2 represents a modification thereof.

Referring to Fig. 1, 21 indicates the laminated core of the rotor held together by the strong plates or disks 22.

The disk at one end of the rotor rests against the shaft collar 23, and the disk at the other end rests against a spacing sleeve 24 which is in turn held by the inner ring of the ball bearings 28 assumed to be pressed tightly upon the shaft end. In order to accurately maintain the stack of rotor laminations 21 together in axial direction, the surface of the short-circuiting rings 25 is recessed, and the disks engage the rings in these recesses. In this manner the core laminations 21 together with the short-circuiting rings 25 are rigidly connected with the shaft 26, so that it is impossible for the short-circuiting rings to vibrate independently, and to thereby stretch the conductor bars 27. While in the present modification the inner ball bearing race is assumed to be pressed onto the shaft end, in order to hold the aforementioned assembly in place, any other conventional equivalent means may be used for that purpose.

Fig. 2 shows a further embodiment of the invention. The short-circuiting rings 31 are here formed as the end disks or plates for the rotor laminations, extending to the shaft 32 and consisting of as light and rigid a material as possible, for example aluminium or one of its alloys, cast or drawn in cold condition. Vibrations of the short-circuiting disks 31 are prevented by the spacing sleeves 34 resting against the inner rings of the ball bearings 33. The spacing sleeves 34 thus also hold the laminated core 35 in its position in axial direction. In this manner the rotor bars 36 are also relieved from forces otherwise exerted by the independent vibrations of the short-circuiting members.

Besides for driving electrical percussion tools, the squirrel-cage rotor according to my invention is suitable for use in all cases where the motor is subjected to strong vibrations, shocks or impacts in the direction of its axis, for example for driving compressors of the reciprocating or piston type blowers or the like. Through my invention a considerable increase in the reliability of service and life of the motor is obtained also in such cases.

I claim as my invention:

1. A short-circuit rotor for induction motors having a shaft, a laminated core mounted thereon and provided with slots, conductor bars in said slots and short-circuit disks fixed to said bars and disposed at the ends of said core to hold its laminations tightly together, a ball bearing fixed on each shaft end and a spacing collar between each bearing and the adjacent short-circuiting disk for locking said disks against axial movement on said shaft to prevent longitudinal deformations of the conductor bars due to vibratory forces in the direction of the rotor axis occurring during the motor operation.

2. A short-circuit rotor for induction motors having a shaft, a laminated core mounted thereon and provided with slots, conductor bars in said slots and short-circuit disks fixed to said bars and disposed at the ends of said core to hold its laminations tightly together, a ball bearing fixed on each shaft end, said disks being locked between said ball bearings against axial movement on said shaft to prevent longitudinal deformations of the conductor bars due to vibratory forces in the direction of the rotor axis occurring during the motor operation.

EELCO BISSCHOP.